US012626373B2

(12) United States Patent
King et al.

(10) Patent No.: US 12,626,373 B2
(45) Date of Patent: May 12, 2026

(54) SMARTPHONE MOTION TRACKING SYSTEM

(71) Applicant: Genius Sports SS, LLC, Los Angeles, CA (US)

(72) Inventors: Kevin William King, Los Angeles, CA (US); Rajiv Tharmeswaran Maheswaran, Wausau, WI (US); Tracey Chui Ping Ho, South Pasadena, CA (US); Yu-Han Chang, South Pasadena, CA (US); Alexa Chen Lan Chang, South Pasadena, CA (US); Jeffrey Wayne Su, South Pasadena, CA (US)

(73) Assignee: Genius Sports SS, LLC, Los Angeles, CA (US)

( * ) Notice: Subject to any disclaimer, the term of this patent is extended or adjusted under 35 U.S.C. 154(b) by 175 days.

(21) Appl. No.: 18/351,249

(22) Filed: Jul. 12, 2023

(65) Prior Publication Data

US 2024/0020856 A1    Jan. 18, 2024

Related U.S. Application Data

(60) Provisional application No. 63/388,495, filed on Jul. 12, 2022.

(51) Int. Cl.
*G06T 7/292*        (2017.01)
*G06V 10/12*        (2022.01)
(Continued)

(52) U.S. Cl.
CPC .............. *G06T 7/292* (2017.01); *G06V 10/12* (2022.01); *G06V 20/42* (2022.01); *G06V 40/10* (2022.01);
(Continued)

(58) Field of Classification Search
CPC . G06T 2207/10016; G06T 2207/20084; G06T 2207/30196; G06T 2207/30221;
(Continued)

(56) References Cited

U.S. PATENT DOCUMENTS 11,373,318 B1 *  6/2022  McKennoch .......... G06V 20/52
2008/0192116 A1   8/2008  Tamir et al.
(Continued)

FOREIGN PATENT DOCUMENTS

EP            3882811 A1    9/2021
WO    WO-2019183235 A1 *  9/2019  ........... G01S 3/7864

OTHER PUBLICATIONS

Philip W Shin et al: "Context-Aware Collaborative Object Recognition for Distributed Multi Camera Time Series Data", Information and Communication Technology, ACM, 2 Penn Plaza, Suite 701NewYorkNY10121-07010USA, Dec. 4, 2019 (Dec. 4, 2019), pp. 154-161, XP058445879,DOI: 10.1145/3368926 .3369666 ISBN: 978-1-4503-7245-9.

*Primary Examiner* — Behrooz M Senfi
(74) *Attorney, Agent, or Firm* — EIP US LLP

(57)            ABSTRACT

A system for processing video of a sporting activity is disclosed. The system comprises: a plurality of portable electronic devices, each of which comprises at least one camera for capturing video of the sporting activity; and one or more aggregated data processing devices. Each portable electronic device is configured to: generate, using its camera (s), video data representative of the sporting activity; perform processing of the video data to generate video analysis data; and transfer the video analysis data to the aggregated data processing device(s). The aggregated data processing device(s) are configured to perform processing of the video analysis data, so as to generate activity analysis data. Apparatus for holding a portable electronic device is also disclosed, which comprises a housing, within which the por- (Continued)

table electronic device can be mounted and enclosed, and an active cooling system for cooling the portable electronic device.

18 Claims, 4 Drawing Sheets

(51) Int. Cl.
| | |
|---|---|
| *G06V 20/40* | (2022.01) |
| *G06V 40/10* | (2022.01) |
| *H04N 23/52* | (2023.01) |
| *H04B 1/3888* | (2015.01) |

(52) U.S. Cl.
CPC ... *H04N 23/52* (2023.01); *G06T 2207/10016* (2013.01); *G06T 2207/20084* (2013.01); *G06T 2207/30196* (2013.01); *G06T 2207/30221* (2013.01); *H04B 1/3888* (2013.01)

(58) Field of Classification Search
CPC ........ G06T 7/292; G06V 10/12; G06V 10/82; G06V 20/42; G06V 20/52; G06V 40/10; G06V 40/23; H04B 1/3888
USPC .......................................................... 348/157
See application file for complete search history.

(56) References Cited

U.S. PATENT DOCUMENTS

| | | |
|---|---|---|
| 2012/0327194 A1 | 12/2012 | Shiratori et al. |
| 2014/0176720 A1 | 6/2014 | Anderson |
| 2018/0225840 A1 | 8/2018 | Ikeda et al. |
| 2020/0394413 A1 | 12/2020 | Bhanu et al. |
| 2021/0240992 A1 | 8/2021 | Chan et al. |
| 2022/0207754 A1* | 6/2022 | Han ........................ G06T 7/292 |
| 2024/0259537 A1* | 8/2024 | Imes ................ G06K 19/06037 |

* cited by examiner

FIG. 5

SMARTPHONE MOTION TRACKING SYSTEM

CROSS-REFERENCE TO RELATED APPLICATIONS

The present application claims the benefit of U.S. Patent Application Ser. No. 63/388,495, filed Jul. 12, 2022, and entitled "SMARTPHONE MOTION TRACKING SYSTEM".

The content of the foregoing application is hereby incorporated by reference in its entirety for all purposes.

BACKGROUND OF THE INVENTION

Field of the Invention

The present invention relates to methods and systems for processing video, in particular video of a sporting activity, such as a sporting event or a practice session. In embodiments disclosed herein, video of the sporting activity is taken from multiple viewpoints.

Description of the Related Technology

Sports serve as a vital source of entertainment and leisure for millions of people worldwide. The use of video in sports has revolutionized the way teams and athletes analyze, strategize, and improve their performance. Video analysis allows for detailed review of gameplay, technique, and tactics, providing valuable insights that can lead to enhanced performance on the field. Coaches can study their team's strengths and weaknesses, identify patterns, and make data-driven decisions to optimize strategies. Players can analyze their own performances, identify areas for improvement, and refine their skills with precision.

Video technology has also transformed the fan experience, allowing spectators to relive and dissect pivotal moments, gain deeper understanding of the game, and engage in discussions and debates with other fans.

SUMMARY

In accordance with a first aspect of the present disclosure there is provided a system for processing video of a sporting activity, the system comprising: a plurality of portable electronic devices, each of which comprises at least one camera for capturing video of the sporting activity from a viewpoint of the electronic device; and one or more aggregated data processing devices, which are in data communication with the plurality of portable electronic devices, wherein each portable electronic device is configured to: generate, using the at least one camera, video data representative of the sporting activity; perform processing of the video data to generate video analysis data; and transfer the video analysis data to the one or more aggregated data processing devices, and wherein the one or more aggregated data processing devices are configured to: perform processing of the video analysis data from the plurality of portable electronic devices, so as to generate activity analysis data.

In examples, at least some of the portable electronic devices are mobile devices. In addition, or instead, at least some of the portable electronic devices may be smartphones or tablet computing devices.

In accordance with a further aspect of the present disclosure there is provided a system for analyzing data relating to a sporting activity, the system comprising one or more aggregated data processing devices, which are configured to: receive, from each of a plurality of portable electronic devices, video analysis data that has been generated by the portable electronic device in question processing video data generated by at least one camera of the portable electronic device; and perform processing of the video analysis data from the plurality of portable electronic devices, so as to generate activity analysis data.

In accordance with yet a further aspect of the present disclosure there is provided a portable electronic device, comprising: at least one processor; at least one camera; and computer readable storage medium comprising instructions, which, when executed by the at least one processor, cause the portable electronic device to: generate, using the at least one camera, video data representative of a sporting activity; perform processing of the video data to generate video analysis data; and transfer the video analysis data to the one or more aggregated data processing devices.

In accordance with a further aspect of the present disclosure there is provided a computer program product comprising instructions which, when the instructions are executed by at least one processor of a portable electronic device, cause the portable electronic device to: generate, using at least one camera of the portable electronic device, video data representative of a sporting activity; perform processing of the video data to generate video analysis data; and transfer the video analysis data to the one or more aggregated data processing devices.

In accordance with a still further aspect of the present disclosure there is provided an apparatus for holding a portable electronic device that comprises at least one camera, the apparatus comprising: a housing, within which the portable electronic device is mountable, such that the housing encloses the portable device within an interior of the housing; and an active cooling system for cooling the portable electronic device.

In some examples, the housing sealingly encloses the portable electronic device. In addition, or instead, the housing may cover, and thereby render inaccessible, a touchscreen of the enclosed portable electronic device.

In examples, the active cooling system comprises a fan. In addition, or instead, the active cooling system may comprise a pump and one or more conduits, through which a coolant fluid is circulated, during use of the apparatus, using the pump. The active cooling system may, in addition or instead, comprise a thermoelectric cooling system.

While in the aspects and embodiments above reference is made to a sporting activity, in systems, methods and apparatus according to further aspects the activity may be a non-sporting activity, such as a non-sporting live event (e.g., a concert, a comedy show, or a play) or a non-sporting practice session (e.g., a music practice, or a rehearsal for a play).

Further features and advantages will become apparent from the following description, given by way of example only, which is made with reference to the accompanying drawings.

BRIEF DESCRIPTION OF THE DRAWINGS

FIG. 5 is a schematic cross-sectional view of the apparatus for holding a portable electronic device shown in FIG. 3.

DETAILED DESCRIPTION OF CERTAIN INVENTIVE EMBODIMENTS

Embodiments of this application relate to automated analysis of video of a sporting activity, in particular where video of the sporting activity is captured from multiple viewpoints.

Figure 1:
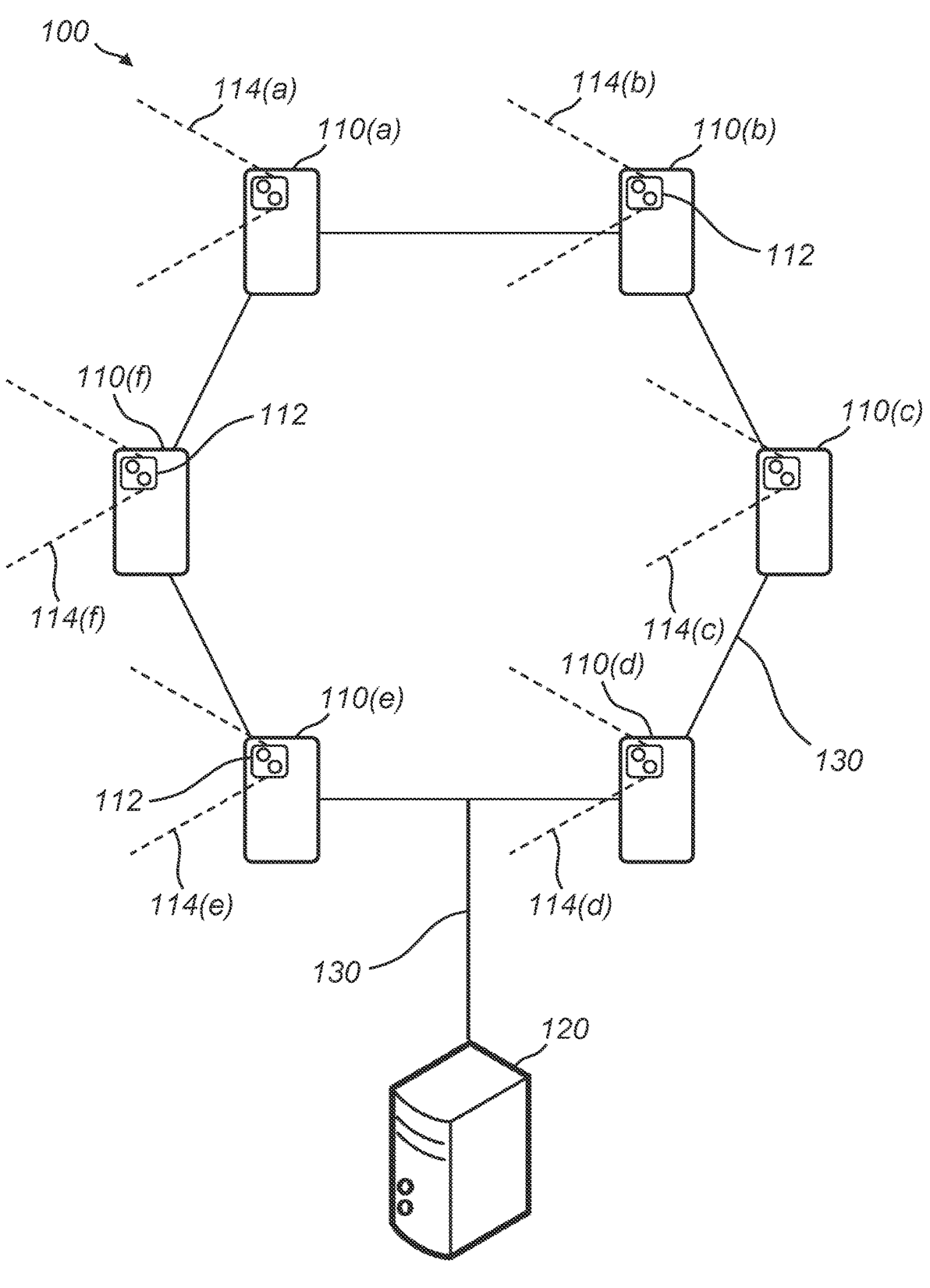
FIG. 1 is a schematic diagram illustrating a video processing system according to an illustrative embodiment.

Reference is directed firstly to FIG. 1, which is a schematic diagram illustrating a video processing system according to an illustrative embodiment. As shown, the system 100 comprises a plurality of portable electronic devices 110(*a*)-(*f*), each of which comprises at least one camera 112. As also shown, each of the portable electronic devices 110(*a*)-(*f*) is arranged to capture video from a respective, different viewpoint 114. In the particular example shown, the system 100 includes six portable electronic devices 110(*a*)-(*f*); however, this is of course not essential. Acceptable performance might be achieved with as few as two or three portable electronic devices 110(*a*)-(*f*). Conversely, the scalable nature of the system 100 enables a large number (e.g., 10 or more) of portable electronic devices 110(*a*)-(*f*) to be used as part of the system 100.

In the specific embodiment shown in FIG. 1, each portable electronic device 110 is a smartphone. However, this is by no means essential and in other embodiments some or all of the portable devices 110(*a*)-(*f*) could be, for example, tablet computing devices, or any suitable kind of different portable electronic device 110 having one or more cameras, and sufficient processing power to operate as described herein.

Modern portable electronic devices 110 that have cameras (such as, in particular, smartphones and tablet computing devices) are: readily available, allowing the system 100 to be easily scaled up with the addition of further portable electronic devices 110(*a*)-(*f*), and allowing the system 100 to be easily upgraded, taking advantage of future advances in the capabilities of portable electronic devices; straightforward to configure for use in the system 100, by installation of suitable software on the portable electronic devices 110, and by use of the wireless and/or wired connectivity of the portable electronic devices 110; typically able to capture video at high resolution and/or high frame rates using the cameras of such devices; and able to offer significant processing power.

In the system 100 of FIG. 1, each of the portable electronic devices 110(*a*)-(*f*) is configured (e.g., by suitable programming of the on-board processor(s) of each device) to perform processing of the video data generated by the device's camera(s) 112, so as to generate video analysis data. As will be discussed in more detail below, the processing may, for example, identify objects or features in the video and/or may track motion in the video, and the video analysis data may be representative of the identified objects, features, motion, etc, rather than being representative of video, as such. Accordingly, the video analysis data does not comprise any data that is representative of video of the sporting activity; instead, the video analysis data may, for example, be representative solely of analytics that are derived from the video data generated by the device's camera(s) 112. This may very significantly reduce the bandwidth requirements of the system 100. Moreover, in some embodiments, the plurality of portable electronic devices 110(*a*)-(*f*) may be configured such that they do not transmit any data that is representative of video of the sporting activity to the server 120.

However, in other embodiments, some data that is representative of video of the sporting activity may be transmitted to the server by the portable electronic devices 110(*a*)-(*f*). Nevertheless, it is envisaged that such video data would, in many cases, have a substantially lower bitrate than the video data generated by the device's camera(s) 112, so as to reduce the bandwidth requirements of the system 100.

More generally, it is envisaged that the average bitrate for data transfer from each of the portable electronic devices 110(*a*)-(*f*) to the server 120 may be substantially less than the bitrate of the video data generated by the device's camera(s) 112. For example, it may be less than 50%, less than 25%, less than 10%, less than 5%, or even less than 1% of the bitrate of the video data generated by the device's camera(s) 112.

Returning to FIG. 1, it may be noted that the system 100 further comprises a server 120. As indicated by the lines in FIG. 1 linking the portable electronic devices 110(*a*)-(*f*) with the server 120, the server 120 is in data communication with the portable electronic devices 110(*a*)-(*f*). This allows the portable electronic devices 110(*a*)-(*f*) to transmit the video analysis data that each of them generates to the server 120. The server 120 in turn processes the aggregated video analysis data that it receives from the portable electronic devices 110(*a*)-(*f*), so as to generate activity analysis data.

In some examples, the server 120 may be located in the same physical location as the portable electronic devices 110(*a*)-(*f*). For example, the server 120 may be located in a server room at the venue where the sporting activity is taking place. Alternatively, the server 120 might be located in a truck parked on-site at the venue. However, in still other examples, the server 120 could be a remote/cloud server.

It should be appreciated that, although the lines linking the portable electronic devices 110(*a*)-(*f*) in FIG. 1 form a ring, this is merely schematic and is not intended to imply any particular topology for the data connections between the portable electronic devices 110(*a*)-(*f*) and the server 120. Various topologies are considered suitable for these data connections, such as a hub and spoke topology (e.g., with the server 120 being the hub), a mesh topology (particularly with wireless connections, in which case, the portable electronic devices 110(*a*)-(*f*) may for example be connected to one or more access points and/or to each other), or a tree topology (e.g., with multiple access points or switches connected to the main line (trunk) with one or more portable electronic devices 110(*a*)-(*f*) connected to each switch (branch)).

Furthermore, the data connections need not be physical connections and hence, in some embodiments, the portable electronic devices 110(*a*)-(*f*) may communicate wirelessly with the server 120, for example using 5G (although communication over 4G, or Wi-Fi might be utilized in other embodiments). Nevertheless, in embodiments where at least some of the data connections between the portable electronic devices 110(*a*)-(*f*) and the server 120 are physical connections, it is envisaged that such physical connections may, for example, be provided (at least in part) using Power over Ethernet. Conveniently, Power over Ethernet can provide not only data connectivity, but also electrical power to the portable electronic devices 110(*a*)-(*f*). Providing a continual supply of electrical power to the portable electronic devices 110(*a*)-(*f*) may be appropriate where the processing of video data carried out by the portable electronic devices 110(*a*)-(*f*) is particularly computationally intensive, and therefore consumes significant power.

The system 100 of FIG. 1 may, for example, be utilized for automated officiating, health and fitness measurements, player performance analysis, and/or metaverse or next-gen media applications. Such applications may, in some cases, require very high resolution video, very high frame rates, and/or very large numbers of camera angles. Ordinarily, this would result in significant bandwidth requirements and set-up costs for the system.

The inventors have made the realization that the processing power provided by modern portable electronic devices enables such devices to carry out complex processing of video data that might otherwise have been carried out by one or more servers in a conventional system. As a result of its novel architecture, in which at least some video processing is distributed among the plurality of portable electronic devices 110(*a*)-(*f*), rather than being performed centrally at the server 120 (or at more than one such server), the system 100 of FIG. 1 may exhibit greater performance, improved scalability, lower setup costs and/or reduced bandwidth requirements, as compared with a conventional system where multiple cameras are connected to one or more servers that process video data.

In some embodiments, the processing of video data by each portable electronic device 110(*a*)-(*f*) may comprise using at least one neural network. Processing using neural networks requires significant processing power, especially in embodiments where the neural network is applied frame-by-frame. As such, it is a notable example of a type of processing that can, in the system 100 of Figure, be carried out by (and distributed among) the plurality of portable electronic devices 110(*a*)-(*f*), rather than, for example, a server. Neural networks can be used for various purposes, such as objection identification/recognition or feature extraction.

In some examples, the video data processing carried out by each portable electronic device 110(*a*)-(*f*) utilizes an object identification/recognition algorithm. In some cases, the object identification/recognition algorithm may utilize a neural network, such as YOLO or R-CNN. Neural networks for objection identification/recognition may, in particular, be used to identify participants in the sporting activity (e.g., players, referees, umpires or the like), body parts of participants (e.g., participants' heads, hair, torsos, feet, and/or the participants' shoulders, knees, hips and/or other joints) and/or sporting objects being used in the activity (e.g.: the object being contested in the sporting activity, such as the ball, in ball sports like soccer or basketball, or the puck, in hockey; or equipment used by players to play the particular sporting activity, such as sticks, clubs, rackets etc.). Neural networks for objection identification/recognition may, for example, be trained on images, or videos of sporting activities that have been labelled to indicate the location(s) of objects of interest, such as participants, body parts of participants and/or sporting objects, as discussed above.

In some examples, the processing of video data by each portable electronic device 110(*a*)-(*f*) may comprise identifying one or more participants in the sporting activity. Participant identification may, for example, utilize the output of an object identification/recognition algorithm, as described above. In some cases, participant identification may comprise jersey number detection. Jersey numbers may be mapped to player names. Jersey numbers may then be mapped to player names using official rosters and the like. Jersey number detection may be performed frame-by-frame. Frame-by-frame jersey number detection may be performed using a support vector machine (SVM), a supervised machine learning model used for classification. The SVM may be trained, such as using training sets of manually marked jersey numbers from video of the same kind of sporting activity, for example.

In some examples, the video analysis data generated by each portable electronic device 110(*a*)-(*f*) may comprise motion data, which is representative of the motion, as viewed from the viewpoint 114 of the portable electronic device 110(*a*)-(*f*) in question, of participants in the sporting activity, body parts of such participants and/or sporting objects used in the sporting activity above. Such motion data may be generated, at least in part, using an object identification/recognition algorithm, as described above. For example, by tracking the location, within each video frame, of each object detected by the object identification/recognition algorithm, a temporal track can be generated for each object.

Where the video analysis data generated by each portable electronic device 110(*a*)-(*f*) comprises motion data, the processing of the aggregated video analysis data carried out by the server 120 may comprise determining three-dimensional motion data based on the motion data received from the plurality of portable electronic devices 110(*a*)-(*f*). In cases where the motion data generated by each portable electronic device 110(*a*)-(*f*) is two-dimensional, i.e., the data represents the motion of objects within the frames of the video captured by the device, the processing carried out by the server 120 may, for example, utilize triangulation to determine a 3D position for an object (such as a participant in the sporting activity, a body parts of such a participant or a sporting object used in the sporting activity). However, in some cases, the motion data generated by each portable electronic device 110(*a*)-(*f*) may be three-dimensional, for example because certain assumptions can be made about the movement of the participants, or the sporting objects involved in the sporting activity. In such cases, the processing carried out by the server 120 may, for example, combine the respective estimates of 3D position for an object (such as a participant in the sporting activity, a body parts of such a participant or a sporting object used in the sporting activity) as provided by the portable electronic devices 110(*a*)-(*f*). In some examples, the respective estimates may be combined in a weighted manner, based on, for instance, a probability distribution or confidence of each estimate, e.g., based on the object's distance from each camera/device and/or based on occlusions of each camera.

In some examples, the processing of video data by each portable electronic device 110(*a*)-(*f*) may utilize a compression algorithm. The compression algorithm may, in particular, be used to compress non-video data that is comprised by the video analysis data, such as motion data, and/or data identifying participants in the sporting activity.

In some examples, the video data processing carried out by each portable electronic device 110(*a*)-(*f*) utilizes a spatiotemporal pattern recognition algorithm. Various approaches for spatiotemporal pattern recognition are described in commonly assigned Published US Application No. 2021-0240992 A1 (the disclosure of which is hereby incorporated by reference). As described therein, a spatiotemporal pattern recognition algorithm may, in some examples, extract certain "events". The extracted events may be for example events that correspond to particular understandings of events within the overall sporting event, such as "pick and roll" or "blitz", in the case of basketball. Such events may correspond to real events in a game, and may, in turn, be subject to various metrics, analytic tools, and visualizations around the events. Event recognition may be based on pattern recognition by machine learning.

In other examples, spatiotemporal pattern recognition may be carried out by the server 120, for example based on video analysis data (as received from the portable electronic devices 110(a)-(f)) that comprises motion data, and/or data identifying participants in the sporting activity.

In some examples, the video data processing carried out by each portable electronic device 110(a)-(f) utilizes a feature extraction algorithm, such as a feature pyramid network, or a convolutional neural network. The feature data generated by such a feature extraction algorithm may be passed to the server 120, which can aggregate the feature data from the plurality of portable electronic devices 110 (a)-(f) and feed the aggregated feature data into a deep neural network. The deep neural network can, for example, carry out identification based on the aggregated feature data.

In some cases, it may be important that the server 120 can determine the time offsets between the respective video analysis data received from the plurality of portable electronic devices 110(a)-(f). For example, where the video analysis data generated by each portable electronic device 110(a)-(f) comprises motion data, in order for the server 120 to be able to determine three-dimensional motion data for a particular object (e.g. a participant, a part of a participant, or a sporting object, as discussed above) based on motion data received from two (or more) of the portable electronic devices 110(a)-(f), the server 120 typically needs to be able to align in time the motion data from the two or more portable electronic devices 110(a)-(f). To assist in doing so, techniques similar to those disclosed in commonly assigned U.S. patent application Ser. No. 18/346,355 (the disclosure of which is hereby incorporated by reference) may be utilized. Thus, for example, the video analysis data received from each portable electronic device 110(a)-(f) may comprise: data representative of: the time shown on the game clock at various moments in time; data indicating the timing and/or intensity of camera flashes or data from which the timing and/or intensity of camera flashes can be determined (e.g., data representative of total or average pixel intensity); and/or data representative of changes in the images and/or patterns shown on one or more electronic displays that are present at the sporting activity, or data from which such changes can be determined (e.g., data representative of changes in the intensity of some or all of the pixels of the video captured by the portable electronic device that correspond to an electronic display).

Although the system 100 of FIG. 1 is shown as including only a single server 120, it will of course be appreciated that the system 100 could include multiple servers. Moreover, in some embodiments, devices other than servers may process part of, or all of the aggregated data from the plurality of portable electronic devices 110(a)-(f). In particular, it is envisaged that, in some examples, portable electronic devices that are not presently being used to capture video of the sporting activity could be used to process part of or all of such aggregated data. For instance, where the system includes a large number of portable electronic devices, the burden of processing the aggregated data from the plurality of portable electronic devices 110(a)-(f) that are capturing video of the sporting activity may be shifted dynamically to those portable electronic devices which are not presently capturing video of the sporting activity.

Figure 2:
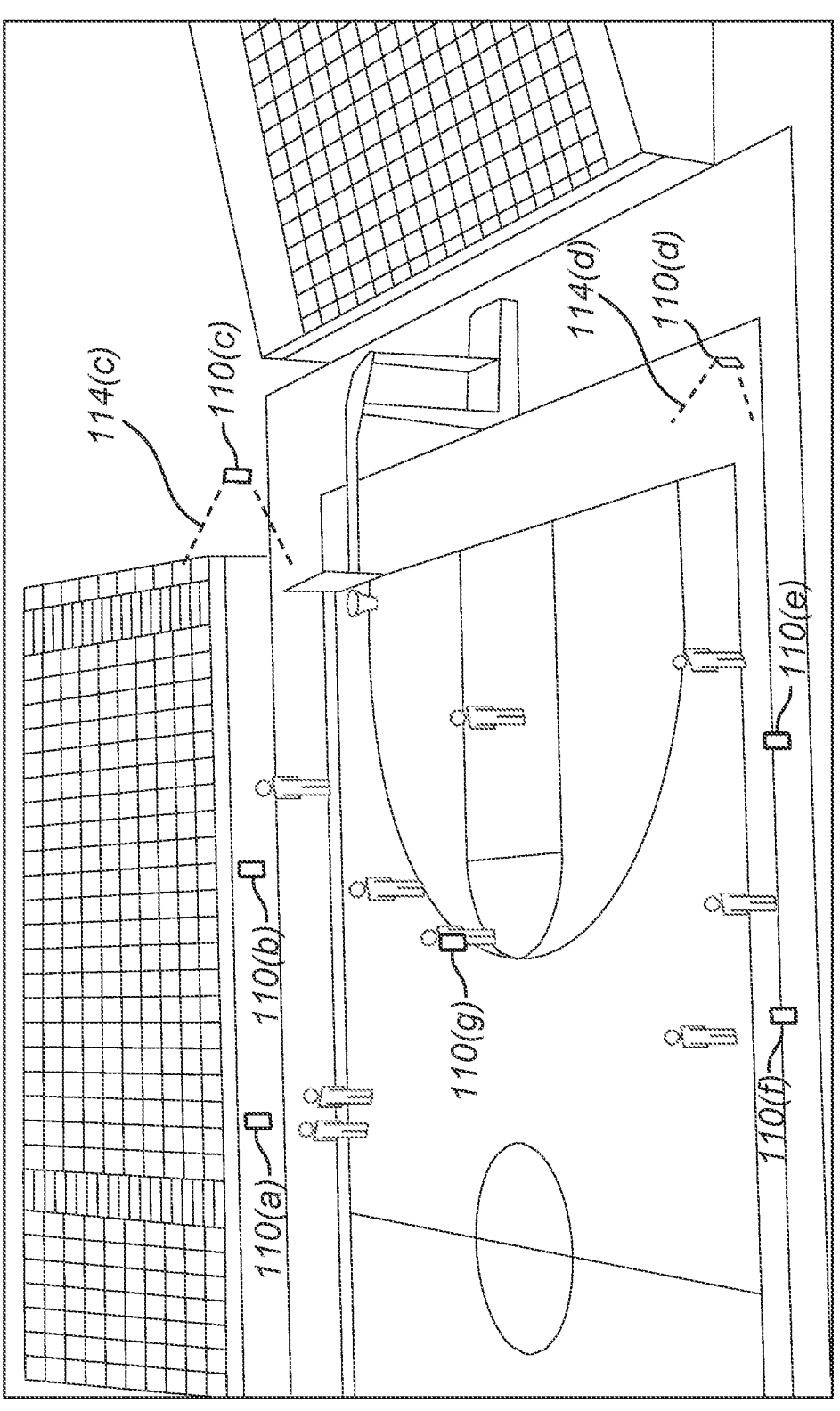
FIG. 2 is a perspective view of the system of FIG. 1 when deployed to analyze a basketball game.

It should additionally be noted that, because the devices 110 are portable, they can easily be installed at various positions and orientations to capture video of a sporting activity. This is illustrated in FIG. 2, which is a perspective view of the system 100 when deployed to analyze a basketball game. As with the portable electronic devices illustrated in FIG. 1, each of the portable electronic devices 100(a)-(g) shown in FIG. 2 has a corresponding, different viewpoint 114 from which it captures video. As shown, most of the plurality of portable electronic devices 100(a)-(f) are arranged at various fixed positions and orientations around the basketball court. However, one of the devices 100(g) is worn by a participant in the sporting activity, providing a viewpoint of the sporting activity that would likely not be available with a conventional camera. The participant could be a player (for example, enabling data characterizing the player's movements to be gathered directly, for instance using accelerometers, gyros etc. provided on-board the portable electronic device, e.g., as part of an IMU) or could be a referee, umpire or the like (for example, to assist with automated officiating). Of course, while in the example deployment illustrated in FIG. 2 only one of the devices 100(g) is shown as being worn by a participant in the sporting activity, it should be understood that in other deployments of the system multiple (or all) of the portable electronic devices 100(a)-(g) could be worn by participants in the sporting activity, rather than being deployed at fixed positions and orientations. Moreover, in some examples, some of the portable electronic devices 100(a)-(g) could be held by coaches or even fans (e.g., the fans' own personal devices could function as the portable electronic devices 100(a)-(g) of the system 100. Furthermore, although a basketball game is depicted in FIG. 2, it will be understood that this is merely illustrative and that the system 100 of FIG. 1 is suitable for deployment at many other types of sporting activity.

Figure 3:
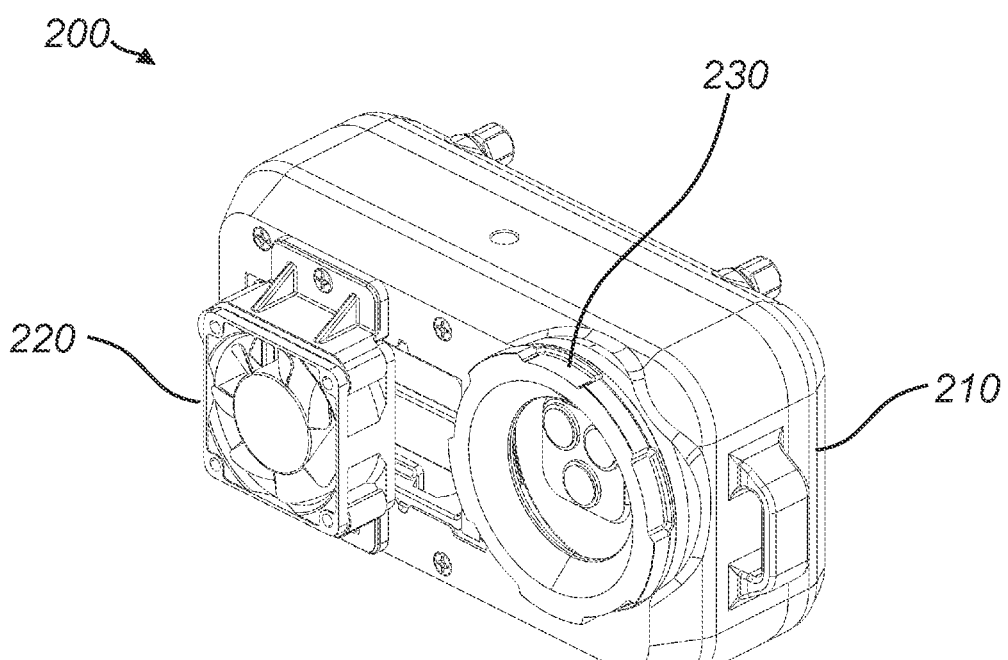
FIG. 3 is an isometric view of an illustrative embodiment of an apparatus for holding a portable electronic device that may be used in the system of FIG. 1.

Attention is next directed to FIG. 3, which is an isometric view of an illustrative embodiment of an apparatus 200 for holding a portable electronic device that may be used in the system 100 of FIG. 1. In the particular example shown, the portable electronic device 110(a)-(f) is a smartphone. However, this is merely illustrative and the apparatus 200 could straightforwardly be configured to hold, for example, a tablet computer instead.

As may be seen, the apparatus 200 comprises a housing 210, within which a portable electronic device 110(a)-(f) can be mounted. The housing 210 encloses the portable electronic device 110(a)-(f) within its interior. Particularly in embodiments of the apparatus 200 that are intended to be deployed outside, the housing 210 may sealingly enclose the portable electronic device 110(a)-(f), such that liquids and dust cannot enter the housing 210 and interfere with the operation of the portable electronic device 110(a)-(f). Furthermore, the housing 210 may cover—and thereby render inaccessible—the touchscreen of the enclosed portable electronic device 110(a)-(f). This prevents direct interaction with the portable electronic device 110(a)-(f), which may detract from its main function of capturing and processing video data in the system of FIG. 1.

As also shown in FIG. 3, the apparatus 200 further comprises an active cooling system 220 for cooling the portable electronic device 110(a)-(f). The cooling system 220 is active in the sense that it is electrically powered. The active cooling system 220 removes heat from the portable electronic device 110(a)-(f) that is generated as a result of computationally complex (and therefore energy intensive) video processing that is carried out by the portable electronic device 110(a)-(f). In the particular example shown in FIG. 3, the cooling system 220 comprises a fan 220. In the particular embodiment shown, the fan 220 blows air over the portable electronic device 110(*a*)-(*f*), cooling it directly.

In the embodiment shown in FIG. 3, the apparatus 200 further comprises a removable lens cover 230, which is disposed over the cameras of the portable electronic device 110(*a*)-(*f*), when the portable electronic device 110(*a*)-(*f*) is mounted within the housing 210. In some embodiments, the lens cover 230 may be configured to accommodate an external lens, which may, for example provide additional magnification and/or a wider field of view.

Figure 4:
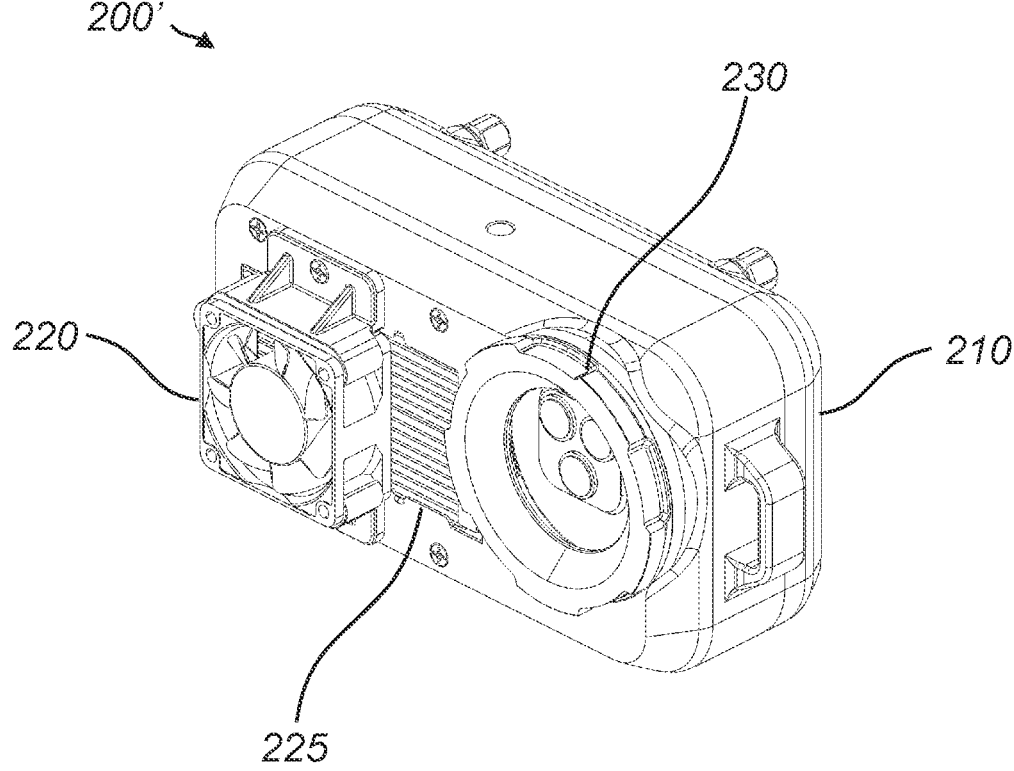
FIG. 4 is an isometric view of a further illustrative embodiment of an apparatus for holding a portable electronic device that may also be used in the system of FIG. 1.

Attention is next directed to FIG. 4, which is an isometric view of a further illustrative embodiment of an apparatus 200' for holding a portable electronic device that may also be used in the system 100 of FIG. 1. The apparatus 200' shown in FIG. 4 is generally the same as the apparatus shown in FIG. 3, except that in the embodiment shown in FIG. 4 the active cooling system comprises not only a fan 220, but also a heat exchanger 225, over which the fan 220 blows air. In the particular example shown, the heat exchanger 225 comprises a plurality of metal (e.g., aluminium) fins.

In some embodiments, the apparatus 200, 200' may comprise mounting features that enable the apparatus to be secured on a conventional camera mounting plate or tripod. In other embodiments, the apparatus 200 may comprise a clip or strap or other fastening device that allows the apparatus to be worn by a participant in a sporting activity.

In some embodiments, the active cooling system may comprise a liquid cooling system, such as a closed loop liquid cooling system. The liquid cooling system may include a pump and one or more conduits, through which a coolant fluid is circulated, during use of the apparatus 200, 200', using the pump. The conduits may pass through, or adjacent a heat exchanger over which a fan (such as fan 220) blows air. The conduits may also pass through a heat exchanger (such as a metal, e.g., copper, plate) within the housing 210 at which heat is transferred from the portable electronic device 110(*a*)-(*f*) to the coolant fluid.

In still further embodiments of the apparatus 200, 200', the active cooling system may be, or may comprise a thermoelectric cooling system.

Figure 5:
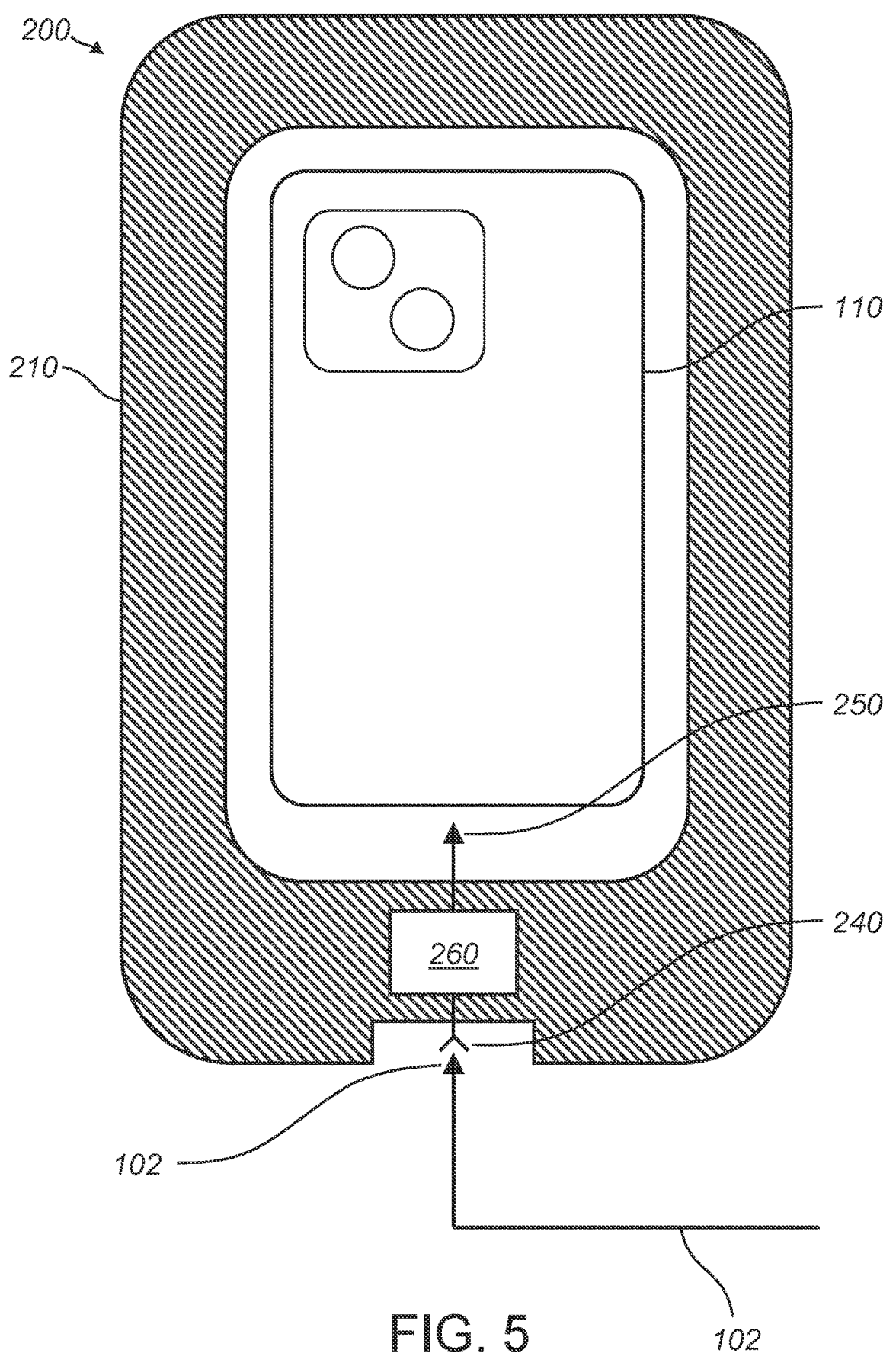

Reference is now directed to FIG. 5, which is a schematic cross-sectional view of the apparatus for holding a portable electronic device shown in FIG. 3. The cross-section allows the portable electronic device 110(*a*)-(*f*) that is enclosed within the housing 210 of the apparatus 200 to be seen. In the particular example shown, the apparatus 200 comprises a Power over Ethernet connector 240, which is accessible from an exterior of the housing. This may allow the apparatus (and thereby the portable electronic device 110(*a*)-(*f*)) to be connected to the server 120 using ethernet cable. As mentioned above, Power over Ethernet conveniently provides not only data connectivity, but also electrical power to the portable electronic device 110(*a*)-(*f*). As also shown in FIG. 5, the apparatus 200 additionally comprises a device connector 250 (such as a USB connector) for connecting to the portable electronic device 110(*a*)-(*f*). As may be seen from FIG. 3, the device connector 250 is located within the interior of the housing 210, and is electrically connected to the Power over Ethernet connector 240 so that data and power can be communicated from the Power over Ethernet connector 240, to the portable electronic device 110(*a*)-(*f*), via the device connector 250, when the portable electronic device 110(*a*)-(*f*) is connected to the device connector 250. As further shown in FIG. 5, the apparatus additionally comprises a convertor unit 260, which converts the Power over Ethernet signal to a form that is compatible with the portable electronic device 110(*a*)-(*f*), such as a USB signal.

Conveniently, the electrical power delivered by the Power over Ethernet connection can be used to power other components of the apparatus 200, such as, in particular, the active cooling system.

It should be noted that, although in the embodiments described above with reference to FIGS. 1-5 video is captured of a sporting activity, it is envisaged that many embodiments may be adapted to capture and analyze video of non-sporting activity, such as a non-sporting live event (e.g., a concert, a comedy show, or a play) or a non-sporting practice session (e.g., a music practice, or a rehearsal for a play).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for processing video of a sporting activity, the system comprising:

a plurality of portable electronic devices, each of which comprises at least one camera for capturing video of the sporting activity from a viewpoint of the electronic device; and one or more aggregated data processing devices, which are, in use, in data communication with the plurality of portable electronic devices, wherein each portable electronic device is configured to:

generate, using the at least one camera, video data representative of the sporting activity;

perform processing of the video data to generate video analysis data; and transfer the video analysis data to the one or more aggregated data processing devices, wherein the one or more aggregated data processing devices are configured to perform processing of the video analysis data from the plurality of portable electronic devices, so as to generate activity analysis data, and wherein the system is configured, in use, to dynamically shift the processing of the video analysis data to one or more of the plurality of portable electronic devices that are not presently capturing video of the sporting activity so that the one or more portable electronic devices that are not presently capturing video of the sporting activity are used as one or more of the one or more aggregated data processing devices by:

receiving video analysis data from one or more of the plurality of portable electronic devices that are presently capturing video of the sporting activity; and processing part or all of the video analysis data.

2. The system of claim 1, wherein the processing of the video data by each portable electronic device comprises using at least one neural network.

3. The system of claim 1, wherein the processing of the video data by each portable electronic device comprises using an object identification algorithm.

4. The system of claim 1, wherein the processing of the video data by each portable electronic device comprises using a spatiotemporal pattern recognition algorithm.

5. The system of claim 1, wherein the processing of the video data by each portable electronic device comprises using a feature extraction algorithm.

6. The system of claim 1, wherein the video analysis data generated by each portable electronic device comprises motion data representative of the motion, as viewed from the portable electronic device, of at least one of:

one or more sporting objects used by participants in the sporting activity;

one or more participants in the sporting activity; and one or more body parts of participants in the sporting activity.

7. The system of claim 6, wherein the processing of the video analysis data comprises determining three-dimensional motion data based on the motion data received from the plurality of portable electronic devices.

8. The system of claim 7, wherein determining the three-dimensional motion data comprises using a triangulation algorithm.

9. The system of claim 1, wherein the video analysis data comprises participant identification data, which indicates the identity of one or more participants in the sporting activity.

10. The system of claim 1, wherein each portable electronic device is additionally configured to transfer to the one or more aggregated data processing devices reduced bitrate video data, which has a lower bitrate than the video data representative of the sporting activity generated by the at least one camera.

11. The system of claim 1, wherein the plurality of portable electronic devices are configured such that they do not transmit any data that is representative of video of the sporting activity to the one or more aggregated data processing devices.

12. The system of claim 1, wherein at least some of the one or more aggregated data processing devices are servers.

13. The system of claim 1, wherein at least some of the portable devices are smartphones.

14. The system of claim 1, wherein at least some of the portable electronic devices receive power, and are in data communication with the one or more aggregated data processing devices, using respective Power over Ethernet connections.

15. The system of claim 1, wherein at least some of the portable devices are in data communication with the one or more aggregated data processing devices using 5G.

16. The system of claim 1, wherein the plurality of portable electronic devices comprises at least 5 portable electronic devices.

17. A method for processing video of a sporting activity, the method being performed by a system comprising:

a plurality of portable electronic devices, each of which comprises at least one camera for capturing video of the sporting activity from a viewpoint of the electronic device; and one or more aggregated data processing devices, which are, in use, in data communication with the plurality of portable electronic devices, the method comprising:

performing, by each portable electronic device:

generating, using the at least one camera, video data representative of the sporting activity;

performing processing of the video data to generate video analysis data; and transferring the video analysis data to the one or more aggregated data processing devices;

processing, by the one or more aggregated data processing devices, the video analysis data from the plurality of portable electronic devices, so as to generate activity analysis data; and dynamically shifting the processing of the video analysis data to one or more of the plurality of portable electronic devices that are not presently capturing video of the sporting activity so that the one or more portable electronic devices that are not presently capturing video of the sporting activity are used as one or more of the one or more aggregated data processing devices by:

receiving video analysis data from one or more of the plurality of portable electronic devices that are presently capturing video of the sporting activity; and processing part or all of the video analysis data.

18. A first portable electronic device for use as one of a plurality of portable electronic devices in a system for processing video of a sporting activity, the system comprising:

the plurality of portable electronic devices, each portable electronic device comprising at least one camera for capturing video of the sporting activity from a viewpoint of the electronic device; and one or more aggregated data processing devices, which are, in use, in data communication with the plurality of portable electronic devices, wherein each portable electronic device is configured to:

generate, using the at least one camera, video data representative of the sporting activity;

perform processing of the video data to generate video analysis data; and transfer the video analysis data to the one or more aggregated data processing devices, wherein the one or more aggregated data processing devices are configured to perform processing of the video analysis data from the plurality of portable electronic devices, so as to generate activity analysis data, and wherein the system is configured to dynamically shift the processing of the video analysis data to one or more of the plurality of portable electronic devices that are not presently capturing video of the sporting activity so that the one or more portable electronic devices that are not presently capturing video of the sporting activity are used as one or more of the one or more aggregated data processing devices by:

receiving video analysis data from one or more of the plurality of portable electronic devices that are presently capturing video of the sporting activity; and processing part or all of the video analysis data, the first portable electronic device being configured to be used as one of the one or more aggregated data processing devices.

* * * * *